(12) United States Patent
Lee et al.

(10) Patent No.: US 7,956,954 B2
(45) Date of Patent: Jun. 7, 2011

(54) OPTICAL SHEET, BACKLIGHT UNIT, AND LIQUID CRYSTAL DISPLAY

(75) Inventors: Junghoon Lee, Cheongju (KR);
Kyongrae Kim, Cheongju (KR)

(73) Assignee: LG Electronics Inc., Seoul (KR)

( * ) Notice: Subject to any disclaimer, the term of this patent is extended or adjusted under 35 U.S.C. 154(b) by 280 days.

(21) Appl. No.: 12/275,128

(22) Filed: Nov. 20, 2008

(65) Prior Publication Data

US 2009/0296023 A1 Dec. 3, 2009

(30) Foreign Application Priority Data

May 28, 2008 (KR) .................. 10-2008-0049663
Aug. 27, 2008 (KR) .................. 10-2008-0083867

(51) Int. Cl.
*G02F 1/1335* (2006.01)

(52) U.S. Cl. ........................................... 349/64

(58) Field of Classification Search ........................ None
See application file for complete search history.

(56) References Cited

U.S. PATENT DOCUMENTS

| | | | |
|---|---|---|---|
| 6,111,699 A | 8/2000 | Iwata et al. | |
| 6,208,466 B1 | 3/2001 | Liu et al. | |
| 2005/0162743 A1 | 7/2005 | Yano et al. | |
| 2006/0147676 A1 | 7/2006 | Yoshida | |
| 2006/0291055 A1 | 12/2006 | Gehlsen et al. | |
| 2007/0190291 A1 | 8/2007 | Kitahara et al. | |
| 2007/0253064 A1 | 11/2007 | Ookubo et al. | |
| 2008/0002256 A1* | 1/2008 | Sasagawa et al. | 359/485 |
| 2008/0167742 A1 | 7/2008 | Endo et al. | |
| 2009/0161221 A1 | 6/2009 | Yang et al. | |
| 2009/0296028 A1* | 12/2009 | Lee et al. | 349/96 |
| 2009/0303589 A1 | 12/2009 | Lee et al. | |

FOREIGN PATENT DOCUMENTS

| | | |
|---|---|---|
| CN | 1135409 C | 1/2004 |
| CN | 1174266 C | 11/2004 |
| CN | 1646947 A | 7/2005 |
| CN | 101124495 A | 2/2008 |
| EP | 0 677 768 A1 | 10/1995 |
| EP | 1 391 758 A2 | 2/2004 |
| EP | 1 852 719 A1 | 11/2007 |
| EP | 1 873 579 A1 | 1/2008 |
| JP | 2001-74919 A | 3/2001 |
| JP | 2005-265864 A | 9/2005 |
| JP | 2006-259257 A | 9/2006 |
| KR | 10-2006-0080888 A | 7/2006 |
| KR | 10-2007-0071346 A | 7/2007 |
| KR | 10-2007-0114955 A | 12/2007 |
| WO | WO-01/22130 A1 | 3/2001 |
| WO | WO-03/034134 A2 | 4/2003 |
| WO | WO-2006/044475 A2 | 4/2006 |
| WO | WO 2008/005760 A1 | 1/2008 |
| WO | WO-2008/047593 A1 | 4/2008 |

* cited by examiner

*Primary Examiner* — Sung H Pak
(74) *Attorney, Agent, or Firm* — Birch, Stewart, Kolasch & Birch, LLP

(57) ABSTRACT

An optical sheet, a backlight unit including the optical sheet and a liquid crystal display including the backlight unit are disclosed. The optical sheet includes a reflective polarizing film, and a first diffusing layer on the reflective polarizing film. The first diffusing layer includes a plurality of first diffusion particles. The first diffusion particles have a volume distribution as a function of diameter. For a diameter D of a first diffusion particle corresponding to a maximum value of the volume distribution, a summation of volumes of a portion of the first diffusion particles having diameters between D−2 μm and D+2 μm is about 40% to 80% of a total volume of the first diffusion particles.

18 Claims, 11 Drawing Sheets

OPTICAL SHEET, BACKLIGHT UNIT, AND LIQUID CRYSTAL DISPLAY

This application claims the benefit of Korean Patent Application Nos. 10-2008-0049663 filed on May 28, 2008 and Korean Patent Application Nos. 10-2008-0083867 filed on Aug. 27, 2008 which is hereby incorporated by reference.

BACKGROUND OF THE INVENTION

1. Field of the Invention

The present invention relates to an optical sheet, a backlight unit including the optical sheet, and a liquid crystal display including the backlight unit, all for the use within a display device such as a television, a computer, a personal data assistant, a mobile telephone, a vehicle (e.g., automobile or airplane) terminal such as a navigation unit or another device.

2. Description of the Related Art

Recently, the types of displays capable of visually displaying information of various electrical signals has rapidly grown. Various kinds of flat panel displays having excellent characteristics such as thin profile, lightness in weight, and low power consumption have been introduced. Accordingly, cathode ray tubes (CRT) are being rapidly replaced by the flat panel displays as the device of choice by the consumer and industry.

The typical flat panel displays include, for example, a liquid crystal display (LCD), a plasma display panel (PDP), a field emission display (FED), and an electroluminescence display (ELD). The conventional liquid crystal display is actively used as display panels of notebook computers, monitors of personal computers, televisions, and other monitors because of ability to provide a high contrast ratio and excellent display characteristics of a still and a moving picture.

The liquid crystal display includes a liquid crystal display panel displaying an image and a backlight unit that is positioned under the liquid crystal display panel to provide the liquid crystal display panel with light.

The backlight unit includes a light source and an optical sheet. The optical sheet typically includes a diffusion sheet, a prism sheet, or a protective sheet.

If the uniformity of a luminance of light provided by the backlight unit to the liquid crystal display panel is reduced, the display quality of the liquid crystal display is reduced. In the related art, the conventional diffusion sheet allows the light to be uniformly diffused over the entire surface of a display area of the liquid crystal display panel so as to prevent a reduction in the luminance uniformity of the light. However, it is difficult to secure a high optical diffusion rate as well as the luminance uniformity using only the conventional diffusion sheet.

SUMMARY OF THE INVENTION

Exemplary embodiments of the invention provide an optical sheet, a backlight unit including the optical sheet, and a liquid crystal display including the backlight unit capable of improving the light diffusion efficiency.

Additional features and advantages of the exemplary embodiments of the invention will be set forth in the description which follows, and in part will be apparent from the description, or may be learned by practice of the exemplary embodiments of the invention. The objectives and other advantages of the exemplary embodiments of the invention will be realized and attained by the structure particularly pointed out in the written description and claims hereof as well as the appended drawings.

In one aspect, there is an optical sheet comprising a reflective polarizing film, and a first diffusing layer on the reflective polarizing film, the first diffusing layer including a plurality of first diffusion particles, wherein when a diameter of the first diffusion particles having a maximum value among volumes of the first diffusion particles is D μm, a summation of volumes of the first diffusion particles having diameters between D−2 μm and D+2 μm is 40% to 80% of a total volume of the first diffusion particles.

In another aspect, there is a backlight unit comprising a light source, and an optical sheet on the light source, the optical sheet including a reflective polarizing film and a first diffusing layer on the reflective polarizing film, the first diffusing layer including a plurality of first diffusion particles, wherein when a diameter of the first diffusion particles having a maximum value among volumes of the first diffusion particles is D μm, a summation of volumes of the first diffusion particles having diameters between D−2 μm and D+2 μm is 40% to 80% of a total volume of the first diffusion particles.

In still another aspect, there is a liquid crystal display comprising a light source, an optical sheet on the light source, the optical sheet including a reflective polarizing film and a first diffusing layer on the reflective polarizing film, the first diffusing layer including a plurality of first diffusion particles, and a liquid crystal display panel on the optical sheet, wherein when a diameter of the first diffusion particles having a maximum value among volumes of the first diffusion particles is D μm, a summation of volumes of the first diffusion particles having diameters between D−2 μm and D+2 μm is 40% to 80% of a total volume of the first diffusion particles.

In yet still another aspect, there is an optical sheet comprising a reflective polarizing film, and a first diffusing layer on the reflective polarizing film, the first diffusing layer including a plurality of first diffusion particles, wherein each of the first diffusion particles has a diameter, and each of the first diffusion particles having the diameter has a volume, wherein when a diameter of the first diffusion particles having a maximum value among the volumes of the first diffusion particles is D μm, a summation of volumes of the first diffusion particles having diameters between D−2 μm and D+2 μm is 40% to 80% of a total volume of the first diffusion particles.

It is to be understood that both the foregoing general description and the following detailed description are exemplary and explanatory and are intended to provide further explanation of embodiments of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE INVENTION

Figure 1:
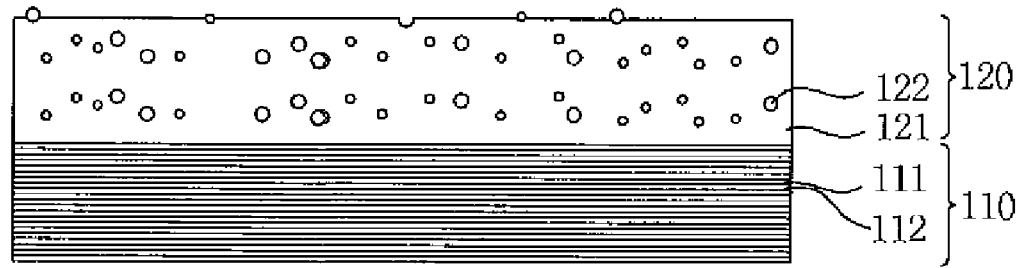
FIG. 1 is a cross-section view of an optical sheet according to an exemplary embodiment of the invention.

Reference will now be made in detail to embodiments of the invention examples of which are illustrated in the accompanying drawings.

In the first embodiment, there is an optical sheet comprising a reflective polarizing film, and a first diffusing layer on the reflective polarizing film, the first diffusing layer including a plurality of first diffusion particles, wherein when a diameter of the first diffusion particles having a maximum value among volumes of the first diffusion particles is D μm, a summation of volumes of the first diffusion particles having diameters between D−2 μm and D+2 μm is 40% to 80% of the first diffusion particles. That is, the first diffusing layer has a predefined volume, with 40% to 80% of that volume composed of diffusion particles having diameters between D−2 μm and D+2 μm. This measure is called a volume percent.

A minimum diameter of the first diffusion particles may be 0.5 μm.

A maximum diameter of the first diffusion particles may be 10 μm.

D may be substantially 3 μm to 6 μm.

Each of the first diffusion particles may be one of a cavity and a bead.

The first diffusion particles may be formed of a material selected from the group consisting of polymethylmethacrylate (PMMA), polystyrene, silicon, and a combination thereof.

The optical sheet may further comprise a first adhesive layer between the reflective polarizing film and the first diffusing layer.

The optical sheet may further comprise a second diffusing layer under the reflective polarizing film.

The optical sheet may further comprise a second adhesive layer between the reflective polarizing film and the second diffusing layer.

The second diffusing layer may include a plurality of second diffusion particles.

The reflective polarizing film includes a first layer and a second layer that are alternately stacked have different refractive indices.

In another embodiment, there is a backlight unit comprising a light source, and an optical sheet on the light source, the optical sheet including a reflective polarizing film and a first diffusing layer on the reflective polarizing film, the first diffusing layer including a plurality of first diffusion particles, wherein when a diameter of the first diffusion particles having a maximum value among volumes of the first diffusion particles is D μm, a percentage of the volume of the first diffusing layer having first diffusion particles with diameters between D−2 μm and D+2 μm is 40% to 80%.

In another embodiment, there is a liquid crystal display comprising a light source, an optical sheet on the light source, the optical sheet including a reflective polarizing film and a first diffusing layer on the reflective polarizing film, the first diffusing layer including a plurality of first diffusion particles, and a liquid crystal display panel on the optical sheet, wherein when a diameter of the first diffusion particles having a maximum value among volumes of the first diffusion particles is D μm, a percentage of the volume of the first diffusing layer having first diffusion particles with diameters between D−2 μm and D+2 μm is 40% to 80%.

In another embodiment, there is an optical sheet comprising a reflective polarizing film, and a first diffusing layer on the reflective polarizing film, the first diffusing layer including a plurality of first diffusion particles, wherein each of the first diffusion particles has a diameter, and each of the first diffusion particles having the diameter has a volume, wherein when a diameter of the first diffusion particles having a maximum value among the volumes of the first diffusion particles is D μm, a percentage of the volume of the first diffusing layer having first diffusion particles with diameters between D−2 μm and D+2 μm is 40% to 80%.

Hereinafter, exemplary embodiments of the invention will be described in detail with reference to the attached drawings.

FIG. 1 is a cross-section view of an optical sheet 100 according to an exemplary embodiment of the invention.

As shown in FIG. 1, the optical sheet 100 may include a reflective polarizing film 110 and a first diffusing layer 120 on the reflective polarizing film 110. The first diffusing layer 120 may include a plurality of first diffusion particles 122.

The reflective polarizing film 110 can transmit or reflect light coming from a light source. The reflective polarizing film 110 may include a first layer 111 formed of a polymer and a second layer 112 positioned adjacent to the first layer 111. The second layer 112 may be formed of a polymer having a refractive index different from a refractive index of the polymer forming the first layer 111.

The reflective polarizing film 110 may have a structure in which the first layers 111 and the second layers 112 are alternately stacked repeatedly. The first layer 111 may be formed of polymethylmethacrylate (PMMA), and the second layers 112 may be formed polyester.

In a smaller display device, the reflective polarizing film 110 may have a thickness of 100 μm to 300 μm. In a larger display device, the reflective polarizing film 110 may have a thickness of 700 μm to 800 μm.

A portion of the light coming from the light source is transmitted by the reflective polarizing film 110, and another portion of the light coming from the light source is reflected toward the light source underlying the reflective polarizing film 110. The light reflected toward the light source is again reflected and is incident on the reflective polarizing film 110. A portion of the light incident on the reflective polarizing film 110 is transmitted by the reflective polarizing film 110, and another portion of the light incident on the reflective polarizing film 110 is again reflected toward the light source underlying the reflective polarizing film 110.

In other words, because the reflective polarizing film 110 has the structure in which the polymer layers each having a different refractive index are alternately stacked, the reflective polarizing film 110 can improve the efficiency of the light coming from the light source using a principle in which molecules of the polymer are oriented in one direction to transmit a polarization of a direction different from the orientation direction of the molecules and to reflect a polarization of the same direction as the orientation direction of the molecules.

The first diffusing layer 120 can diffuse the light passing through the reflective polarizing film 110 through the first diffusion particles 122 inside the first diffusing layer 120.

The first diffusing layer 120 may include a resin 121 having a predetermined adhesive property. The resin 121 may use unsaturated polyester, methyl methacrylate, ethyl methacrylate, isobutyl methacrylate, n-butyl methacrylate, n-butyl methyl methacrylate, acrylic acid, methacrylic acid, hydroxyethyl methacrylate, hydroxypropyl methacrylate, hydroxyethyl acrylate, acrylamide, methylol acrylamide, glycidyl methacrylate, ethyl acrylate, isobutyl acrylate, n-butyl acrylate, acrylic-based material such as 2-ethylhexyl acrylate polymer, 2-ethylhexyl acrylate copolymer or 2-ethylhexyl acrylate terpolymer, urethane-based material, epoxy-based material, melamine-based material, but is not limited thereto.

Each of the first diffusion particles 122 inside the first diffusing layer 120 may be a first bead. Each of the first diffusion particles 122 may be formed of a material selected from the group consisting of polymethylmethacrylate (PMMA), polystyrene, silicon, and a combination thereof.

The first diffusing layer 120 may include 10 to 50 parts by weight of the first diffusion particles 122 based on 100 parts by weight of the resin 121. When the amount of the first diffusion particles 122 based on 100 parts by weight of the resin 121 is equal to or more than 10 parts by weight, the light coming from the light source using the bead can be easily diffused. When the amount of the first diffusion particles 122 based on 100 parts by weight of the resin 121 is equal to or less than 50 parts by weight, a transmittance of the light coming from the light source is not reduced.

Diameters of the first diffusion particles 122 distributed inside the resin 121 may be non-uniform.

The first diffusion particles 122 may have a circle shape, an oval shape, a fused oval/circle shape, and an uneven circle shape, but are not limited thereto.

The first diffusion particles 122 may be non-uniformly distributed inside the resin 121.

The diameters of the first diffusion particles 122 may be substantially 0.5 μm to 10 μm. When the diameters of the first diffusion particles 122 are small, an optical diffusion rate of the optical sheet 100 can be improved by increasing a density of the first diffusion particles 122 inside the first diffusing layer 120. However, when the diameters of the first diffusion particles 122 are very small, the interference of the light coming from the external light source may occur. Therefore, when the diameters of the first diffusion particles 122 are equal to or larger than 0.5 μm, the optical diffusion rate of the optical sheet 100 can be maximally improved to the extent that the interference of the light does not occur.

When the diameters of the first diffusion particles 122 are large, the first diffusing layer 120 has to be thickly formed so as to secure the optical diffusion rate of the optical sheet 100, and thus it is difficult to manufacture the thin profile optical sheet 100. Therefore, when the diameters of the first diffusion particles 122 are equal to or smaller than 10 μm, the thin profile of the optical sheet 100 can be achieved to the extent that the optical diffusion rate of the optical sheet 100 is not reduced.

When a diameter of the first diffusion particles 122 having a desired maximum value is D μm, a percentage of the volume of the first diffusing layer having first diffusion particles with diameters between D−2 μm and D+2 μm is 40% to 80%. This measure is called a volume percentage.

Figure 2:
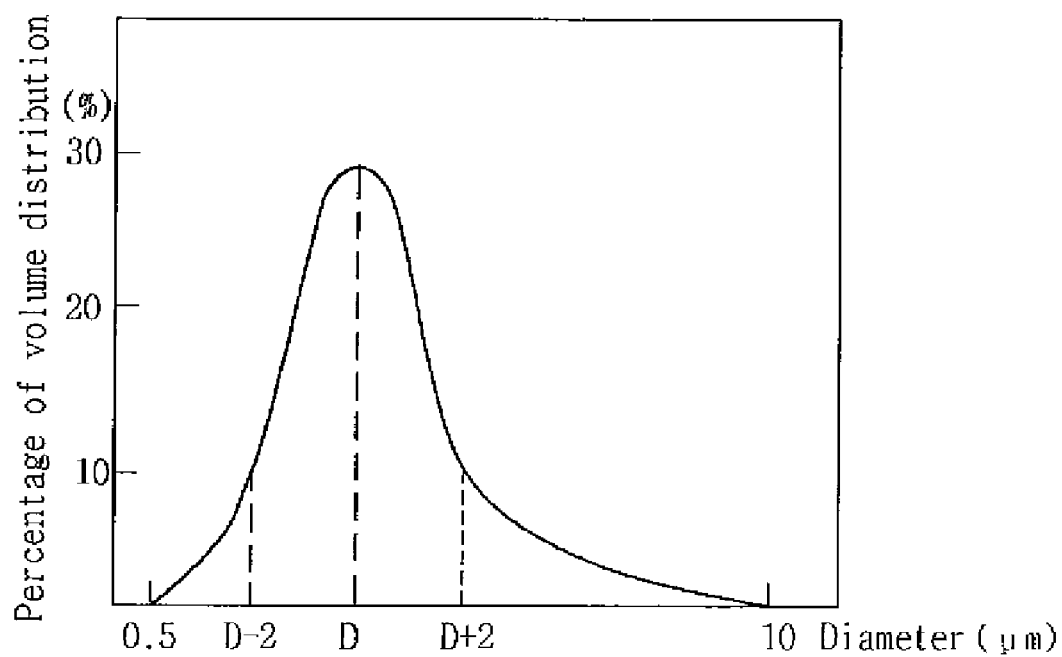
FIG. 2 is a graph illustrating a relationship between a diameter and a volume distribution of all of first diffusion particles of a first diffusing layer.

A relationship between the diameter and the volume percentage of all the first diffusion particles 122 of the first diffusing layer 120 is described with reference to the graph of FIG. 2. In the graph of FIG. 2, the abscissa indicates diameters of the first diffusion particles 122 in unit of μm, and the ordinate indicates a volume percentage of each diameter based on the total volume of the first diffusion particles 122. Again, volume percentage is the percentage of the volume of the diffusing layer that comprises particles of a certain diameter.

As shown in FIG. 2, for the diameter D of the first diffusion particle corresponding to the maximum desired value among volumes of the first diffusion particles 122, a percentage of the volume of the first diffusing layer having first diffusion particles with diameters between D−2 μm and D+2 μm is 40% to 80%. A minimum diameter of the first diffusion particles 122 may be 0.5 μm, and a maximum diameter of the first diffusion particles may be 10 μm. D may be substantially 4 μm to 6 μm.

The volume percentage of the first diffusion particles 122 having the diameter of D μm may be about 30%. The volume percentage of the first diffusion particles 122 having the diameter of D−2 μm may be about 10%. The amount of the first diffusion particles 122 having the diameter of D+2 μm may be about 10%.

For example, for a diameter 5 μm of a first diffusion particle (i.e., D=5), a volume percentage of the first diffusion particles 122 having diameters between 3 μm and 7 μm may be about 40% to 80% of 100%. Or, for a diameter 3 μm of a first diffusion particle (i.e., D=3), a volume percentage of the first diffusion particles 122 having diameters between 1 μm and 5 μm may be about 40% to 80% of 100%.

The following Table 1 indicates the effect of the distribution of diameters on diffusion and luminance of the optical sheet 100. In Table 1, first diffusion particles 122 have diameters between 3 μm and 7 μm when D is 5 μm. The symbols X, ○, and □ indicate bad, good, and excellent states of the characteristics, respectively.

TABLE 1

| Volume percentage of first diffusion particles having diameters between 3 μm and 7 μm (%) | Diffusion effect | Luminance |
| --- | --- | --- |
| 20 | X | ⊚ |
| 30 | X | ⊚ |
| 40 | ○ | ⊚ |
| 50 | ○ | ○ |
| 60 | ○ | ○ |
| 70 | ⊚ | ○ |
| 80 | ⊚ | ○ |
| 90 | ⊚ | X |

As indicated in the above Table 1, when the accumulation is about 40% to 80% of the total volume of the first diffusion particles 122, both of the diffusion effect and the luminance are either good or excellent. This is because the diffusion effect of the light incident on the optical sheet 100 can be improved when the accumulation is equal to or larger than 40%. Also, a reduction in the luminance can be prevented when the accumulation is equal to or smaller than 80%.

Thus, when a volume percentage of the first diffusion particles 122 have diameters between D−2 μm and D+2 μm is about 40% to 80%, the overall diffusion effect of the light coming from the light source can be improved.

A backlight unit including the optical sheet according to the exemplary embodiment of the invention is operated as follows.

Light produced by a light source is incident on the optical sheet. A portion of the light incident on the optical sheet collides with the first diffusion particles of the first diffusing layer, and a traveling path of the light changes. Another portion of the light incident on the optical sheet passes through an emitting surface of the first diffusing layer to travel toward a liquid crystal display panel.

The light colliding with the first diffusion particles collides with other first diffusion particles adjacent to the first diffusion particles, and a traveling path of the light changes repeatedly, with some portions of the light passing through an emitting surface of the first diffusing layer and toward the liquid crystal display panel.

After many collisions on many paths, the light passing through the emitting surface of the first diffusing layer is uniformly incident on the liquid crystal display panel.

As described above, because the light incident on the optical sheet is reflected by the first diffusion particles inside the first diffusing layer several times, the light is diffused while a traveling path of the light changes. Hence, the luminance uniformity can be improved.

Figure 3:
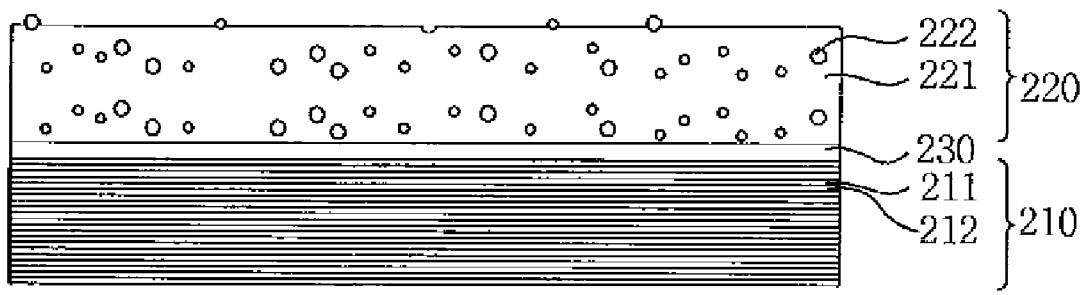
FIG. 3 is a cross-sectional view of an optical sheet according to another exemplary embodiment of the invention.

FIG. 3 is a cross-sectional view of an optical sheet 200 according to another exemplary embodiment of the invention.

As shown in FIG. 3, the optical sheet 200 may include a reflective polarizing film 210 and a first diffusing layer 220 on the reflective polarizing film 210. The first diffusing layer 220 may include a plurality of first diffusion particles 222.

The optical sheet 200 may further include a first adhesive layer 230 between the reflective polarizing film 210 and the first diffusing layer 220.

The first diffusing layer 220 may be formed on the reflective polarizing film 210 by mixing the resin 221 with the first diffusion particles 222 and applying or coating the mixture on the reflective polarizing film 210.

Otherwise, the first diffusing layer 220 may be formed on the reflective polarizing film 210 by forming the resin 221 and the first diffusion particles 222 in a film form using an extrusion molding method or an injection molding method and then attaching it on the reflective polarizing film 210 using an adhesive. In other words, the first adhesive layer 230 may be coated on the reflective polarizing film 210 to form the first diffusing layer 220.

A thickness of the first adhesive layer 230 may be substantially 1 µm to 10 µm in consideration of a light transmittance and adhesive properties, but is not limited thereto.

The reflective polarizing film 210 can transmit or reflect light coming from a light source. The reflective polarizing film 210 may include a first layer 211 formed of a polymer and a second layer 212 positioned adjacent to the first layer 211. The second layer 212 may be formed of a polymer having a refractive index different from a refractive index of the polymer forming the first layer 211. Because the reflective polarizing film 210 was described above with reference to FIG. 1, a description thereof is briefly made or is omitted.

The first diffusing layer 220 can diffuse the light passing through the reflective polarizing film 110 through the first diffusion particles 222 inside the first diffusing layer 220.

The first diffusing layer 220 may include a resin 221 having a predetermined adhesive property.

Each of the first diffusion particles 222 inside the first diffusing layer 220 may be a first bead. Each of the first diffusion particles 222 may be formed of a material selected from the group consisting of polymethylmethacrylate (PMMA), polystyrene, silicon, and a combination thereof.

The first diffusing layer 220 may include 10 to 50 parts by weight of the first diffusion particles 222 based on 100 parts by weight of the resin 221. When the amount of the first diffusion particles 222 based on 100 parts by weight of the resin 221 is equal to or more than 10 parts by weight, the light coming from the light source using the bead can be easily diffused. When the amount of the first diffusion particles 222 based on 100 parts by weight of the resin 221 is equal to or less than 50 parts by weight, a transmittance of the light coming from the light source is not reduced.

The diameters of the first diffusion particles 222 may be substantially 0.5 µm to 10 µm. When the diameters of the first diffusion particles 222 are small, an optical diffusion rate of the optical sheet 200 can be improved by increasing a density of the first diffusion particles 222 inside the first diffusing layer 220. However, when the diameters of the first diffusion particles 222 are very small, the interference of the light coming from the external light source may occur. Therefore, when the diameters of the first diffusion particles 222 are equal to or larger than 0.5 µm, the optical diffusion rate of the optical sheet 200 can be maximally improved to the extent that the interference of the light does not occur.

When the diameters of the first diffusion particles 222 are large, the first diffusing layer 220 has to be thickly formed so as to secure the optical diffusion rate of the optical sheet 200, and thus it is difficult to manufacture the thin profile optical sheet 200. Therefore, when the diameters of the first diffusion particles 222 are equal to or smaller than 10 µm, the thin profile of the optical sheet 200 can be achieved to the extent that the optical diffusion rate of the optical sheet 200 is not reduced.

The first diffusion particles 222 may have a distribution as a function of diameter. For a diameter D of a first diffusion particle, volume percentage of the first diffusion particles 222 having diameters between D−2 µm and D+2 µm may be about 40% to 80%.

As described above, because the light incident on the optical sheet is reflected by the first diffusion particles inside the first diffusing layer several times, the light is diffused while a traveling path of the light changes. Hence, the luminance uniformity can be improved.

Figure 4:
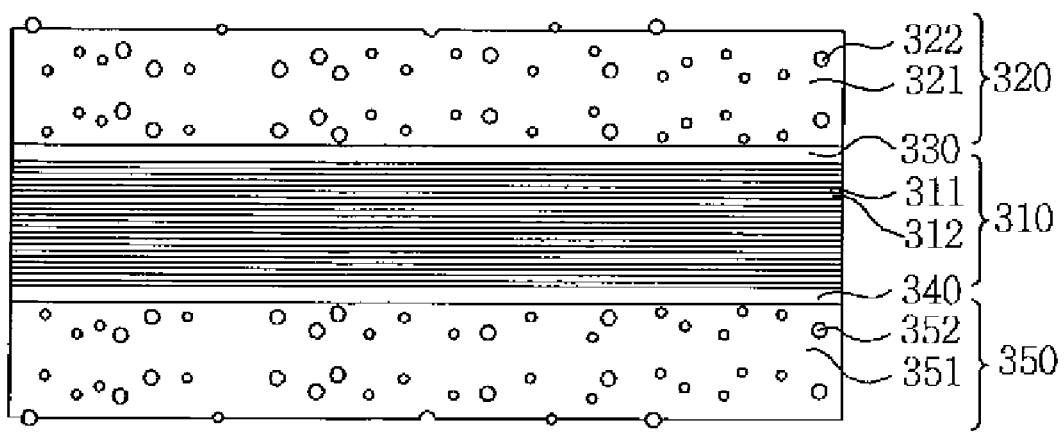
FIG. 4 is a cross-sectional view of an optical sheet according to another exemplary embodiment of the invention.

FIG. 4 is a cross-sectional view of an optical sheet 300 according to another exemplary embodiment of the invention.

As shown in FIG. 4, the optical sheet 300 may include a reflective polarizing film 310, a first adhesive layer 330 on the reflective polarizing film 310, and a first diffusing layer 320 on the first adhesive layer 330. The first diffusing layer 320 may include a plurality of first diffusion particles 322.

The optical sheet 300 may further include a second adhesive layer 340 under the reflective polarizing film 310 and a second diffusing layer 350 on the second adhesive layer 340.

Because a configuration of the reflective polarizing film 310, the first adhesive layer 330, and the first adhesive layer 330 were described above, a description thereof is omitted.

The second adhesive layer 340 used to attach the reflective polarizing film 310 to the second diffusing layer 350 may be the same as the first adhesive layer 330.

The second diffusing layer 350 may be the same as the first diffusing layer 320. The second diffusing layer 350 can diffuse the light coming from an external light source through a plurality of second diffusion particles 352 inside the second diffusing layer 350.

The second diffusing layer 350 may include a resin 351 having a predetermined adhesive property. The resin 351 may use unsaturated polyester, methyl methacrylate, ethyl methacrylate, isobutyl methacrylate, n-butyl methacrylate, n-butyl methyl methacrylate, acrylic acid, methacrylic acid, hydroxyethyl methacrylate, hydroxypropyl methacrylate, hydroxyethyl acrylate, acrylamide, methylol acrylamide, glycidyl methacrylate, ethyl acrylate, isobutyl acrylate, n-butyl acrylate, acrylic-based material such as 2-ethylhexyl acrylate polymer, 2-ethylhexyl acrylate copolymer or 2-ethylhexyl acrylate terpolymer, urethane-based material, epoxy-based material, melamine-based material, but is not limited thereto.

Each of the second diffusion particles 352 inside the second diffusing layer 350 may be a bead. Each of the second diffusion particles 352 may be formed of a material selected from the group consisting of polymethylmethacrylate (PMMA), polystyrene, silicon, and a combination thereof.

The second diffusing layer 350 may include 10 to 50 parts by weight of the second diffusion particles 352 based on 100 parts by weight of the resin 351. When the amount of the second diffusion particles 352 based on 100 parts by weight of the resin 351 is equal to or more than 10 parts by weight, the light coming from the light source using the bead can be easily diffused. When the amount of the second diffusion particles 352 based on 100 parts by weight of the resin 351 is equal to or less than 50 parts by weight, a transmittance of the light coming from the light source is not reduced.

Diameters of the second diffusion particles 352 distributed inside the resin 351 may be non-uniform.

The second diffusion particles 352 may have a circle shape, an oval shape, a fused oval/circle shape, and an uneven circle shape, but are not limited thereto.

The second diffusion particles 352 may be non-uniformly distributed inside the resin 351.

The diameters of the second diffusion particles 352 may be substantially 0.5 μm to 10 μm. When the diameters of the second diffusion particles 352 are small, an optical diffusion rate of the optical sheet 300 can be improved by increasing a density of the second diffusion particles 352 inside the second diffusing layer 350. However, when the diameters of the second diffusion particles 352 are very small, the interference of the light coming from the external light source may occur. Therefore, when the diameters of the second diffusion particles 352 are equal to or larger than 0.5 μm, the optical diffusion rate of the optical sheet 300 can be maximally improved to the extent that the interference of the light does not occur.

When the diameters of the second diffusion particles 352 are large, the second diffusing layer 320 has to be thickly formed so as to secure the optical diffusion rate of the optical sheet 300, and thus it is difficult to manufacture the thin profile optical sheet 300. Therefore, when the diameters of the second diffusion particles 352 are equal to or smaller than 10 μm, the thin profile of the optical sheet 300 can be achieved to the extent that the optical diffusion rate of the optical sheet 300 is not reduced.

As with the first diffusion particles 322, the second diffusion particles 352 may have a distribution as a function of diameter. For a diameter D of a second diffusion particle, a percentage of the volume of the second diffusing layer having second diffusion particles with diameters between D−2 μm and D+2 μm is 40% to 80%.

When the volume percentage of the second diffusion particles 352 having diameters between D−2 μm and D+2 μm is equal to or larger than 40%, the diffusion effect of the light incident on the optical sheet 300 can be improved.

When the volume percentage of the second diffusion particles 352 having diameters between D−2 μm and D+2 μm is equal to or smaller than 80%, a reduction in the luminance can be prevented.

Accordingly, when the volume percentage of the second diffusion particles 352 having the diameters between D−2 μm and D+2 μm is about 40% to 80%, the diffusion effect of the light coming from the light source can be improved.

Figure 5:
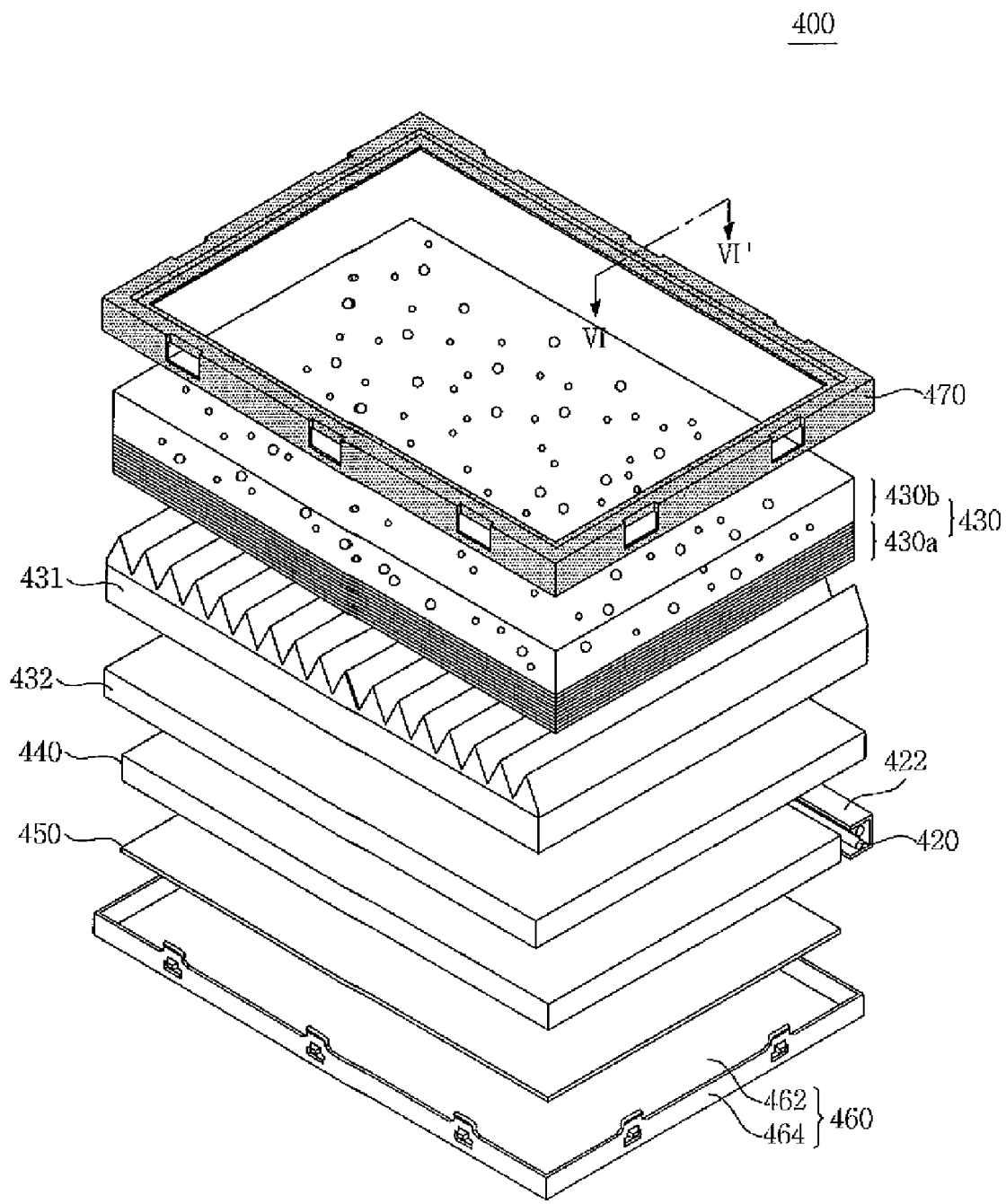
FIGS. 5 to 7 show a backlight unit according to an exemplary embodiment of the invention.
Figure 6:
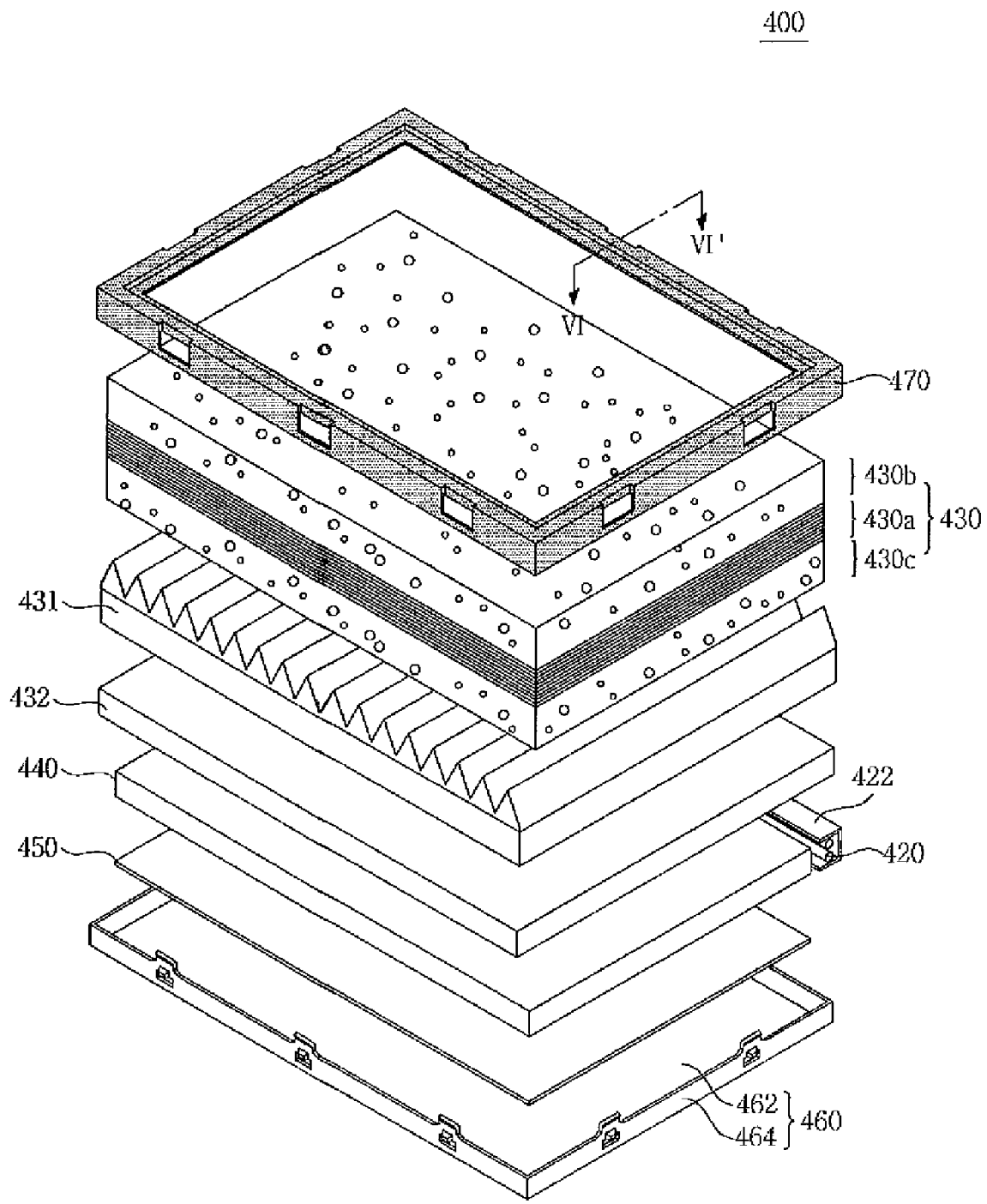
Figure 7:
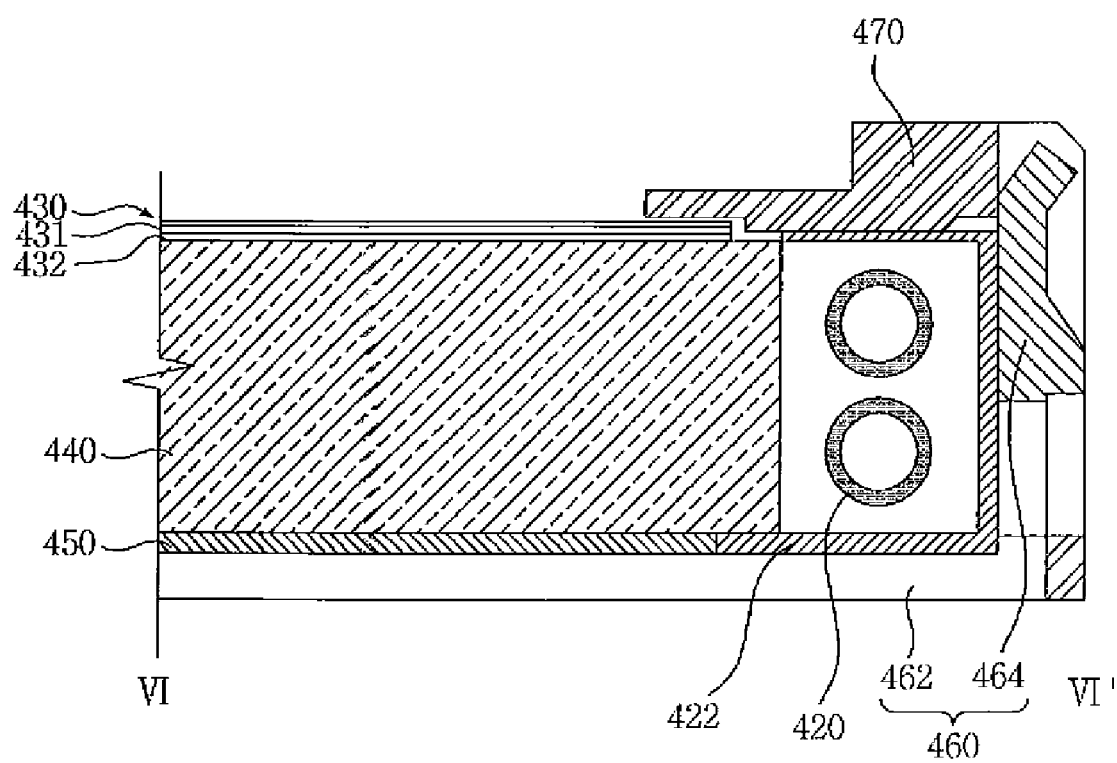

FIGS. 5 to 7 are exploded perspective views and a cross-sectional view illustrating a configuration of a backlight unit 400 including an optical sheet according to the exemplary embodiments of the invention.

FIGS. 5 to 7 show an edge type backlight unit. However, in other embodiments, other types of backlight units may be used. Since a configuration of an optical sheet shown in FIGS. 5 to 7 is substantially the same as the optical sheet according to the exemplary embodiments of the invention, and a description thereabout is briefly made or is entirely omitted.

As shown in FIGS. 5 to 7, the backlight unit 400 may be included in a liquid crystal display and can provide light to a liquid crystal display panel included in the liquid crystal display.

The backlight unit 400 may include a light source 420 and an optical sheet 430. The backlight unit 400 may further include a light guide plate 440, a reflector 450, a bottom cover 460, and a mold frame 470.

The light source 420 can produce light using a drive power received from the outside and emit the produced light.

At least one light source 420 may be positioned at one side of the light guide plate 440 along a long axis direction of the light guide plate 440. At least one light source 420 may be positioned at each of both sides of the light guide plate 440. Light coming from the light source 420 may be directly incident on the light guide plate 440. Or, the light coming from the light source 420 may be reflected from a light source housing 422 surrounding a portion of the light source 420, for example, about ¾ of an outer circumferential surface of the light source 420, and then may be incident on the light guide plate 440.

The light source 420 may be one of a cold cathode fluorescent lamp (CCFL), a hot cathode fluorescent lamp (HCFL), an external electrode fluorescent lamp (EEFL), and a light emitting diode (LED), but is not limited thereto.

The optical sheet 430 may be positioned on the light guide plate 440.

As shown in FIG. 5, the optical sheet 430 may include a reflective polarizing film 430a, and a first diffusing layer 430b on the reflective polarizing film 430a. The first diffusing layer 430b may include a plurality of first diffusion particles. The first diffusion particles may have a volume distribution as a function of diameter. For a diameter D of a first diffusion particle corresponding to a maximum value of the volume distribution, a summation of volumes of a portion of the first diffusion particles having diameters between D−2 μm and D+2 μm may be about 40% to 80% of a total volume of the first diffusion particles.

As shown in FIG. 6, the optical sheet 430 may further include a second diffusing layer 430c, including a plurality of second diffusion particles, under the reflective polarizing film 430a. The second diffusion particles may have a volume distribution as a function of diameter For a diameter D of a second diffusion particle corresponding to a maximum value of the volume distribution, a percentage of the volume of the second diffusing layer having second diffusion particles with diameters between D−2 μm and D+2 μm is 40% to 80%.

In the optical sheet 430, the reflective polarizing film 430a can improve the efficiency of the light, and the first and second diffusing layers 430b and 430c can improve the diffusion effect of the light. Hence, the luminance uniformity of the light can be improved. As a result, the display quality of the backlight unit 400 can be improved.

At least one of a prism sheet 431 and a diffusion sheet 432 may be positioned between the light guide plate 440 and the optical sheet 430. The prism sheet 431 or the diffusion sheet 432 may be positioned on the optical sheet 430, and locations of the prism sheet 431 and the diffusion sheet 432 are not limited thereto.

The light guide plate 440 may face the light source 420. The light guide plate 440 can guide the light so as to emit upward the light coming from the light source 420.

The reflector 450 may be positioned under the light guide plate 440. The reflector 450 can reflect upward the light, which comes from the light source 420 and then is emitted downward via the light guide plate 440.

The bottom cover 460 may include a bottom portion 462 and a side portion 464 extending from the bottom portion 462 to form a recipient space. The recipient space may accommodate the light source 420, the optical sheet 430, the light guide plate 440, and the reflector 450.

The mold frame 470 may be approximately a rectangular-shaped frame. The mold frame 470 may be fastened to the bottom cover 460 from an upper side of the bottom cover 460 in a top-down manner.

Figure 8:
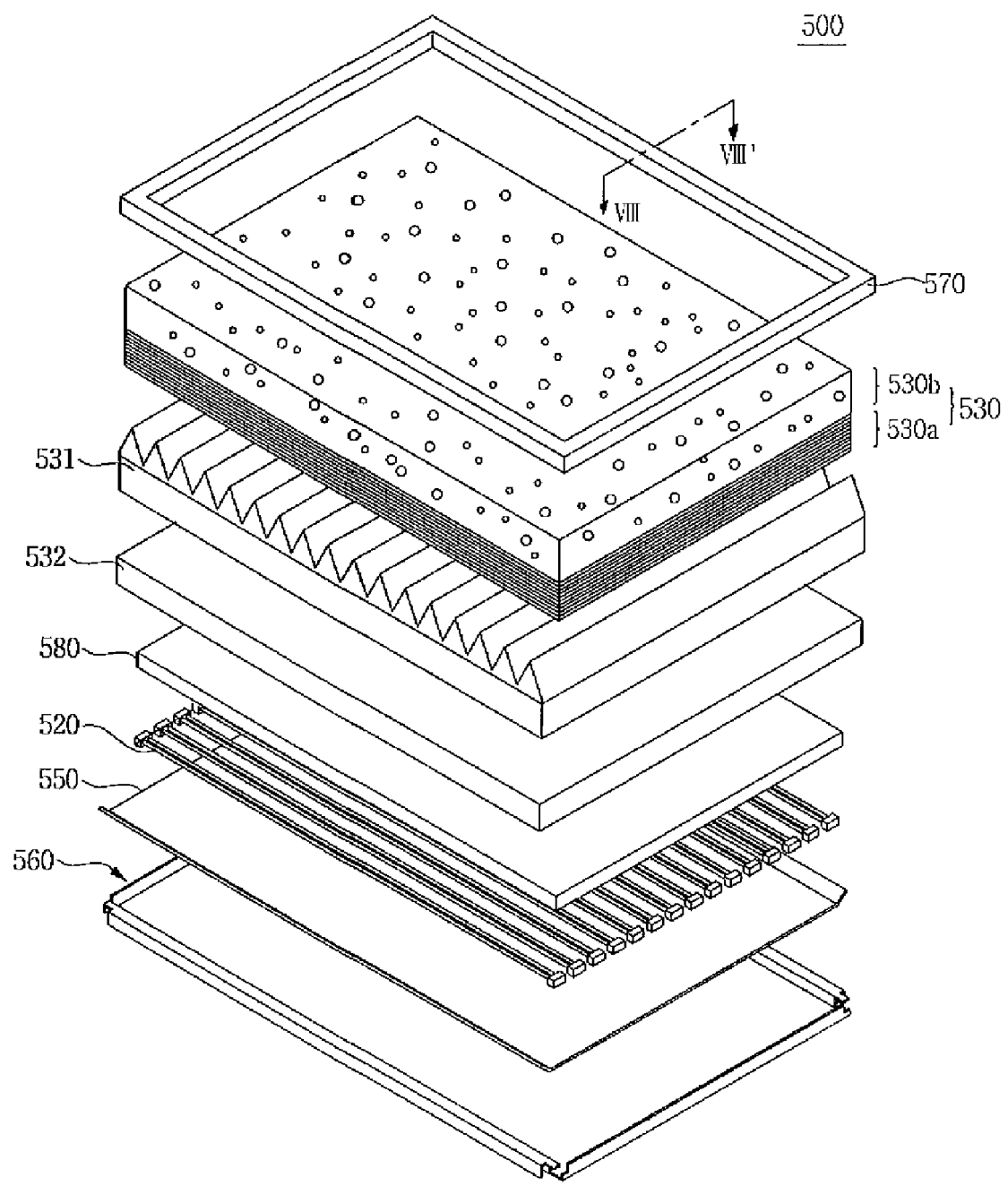
FIGS. 8 to 10 show a backlight unit according to another exemplary embodiment of the invention.
Figure 9:
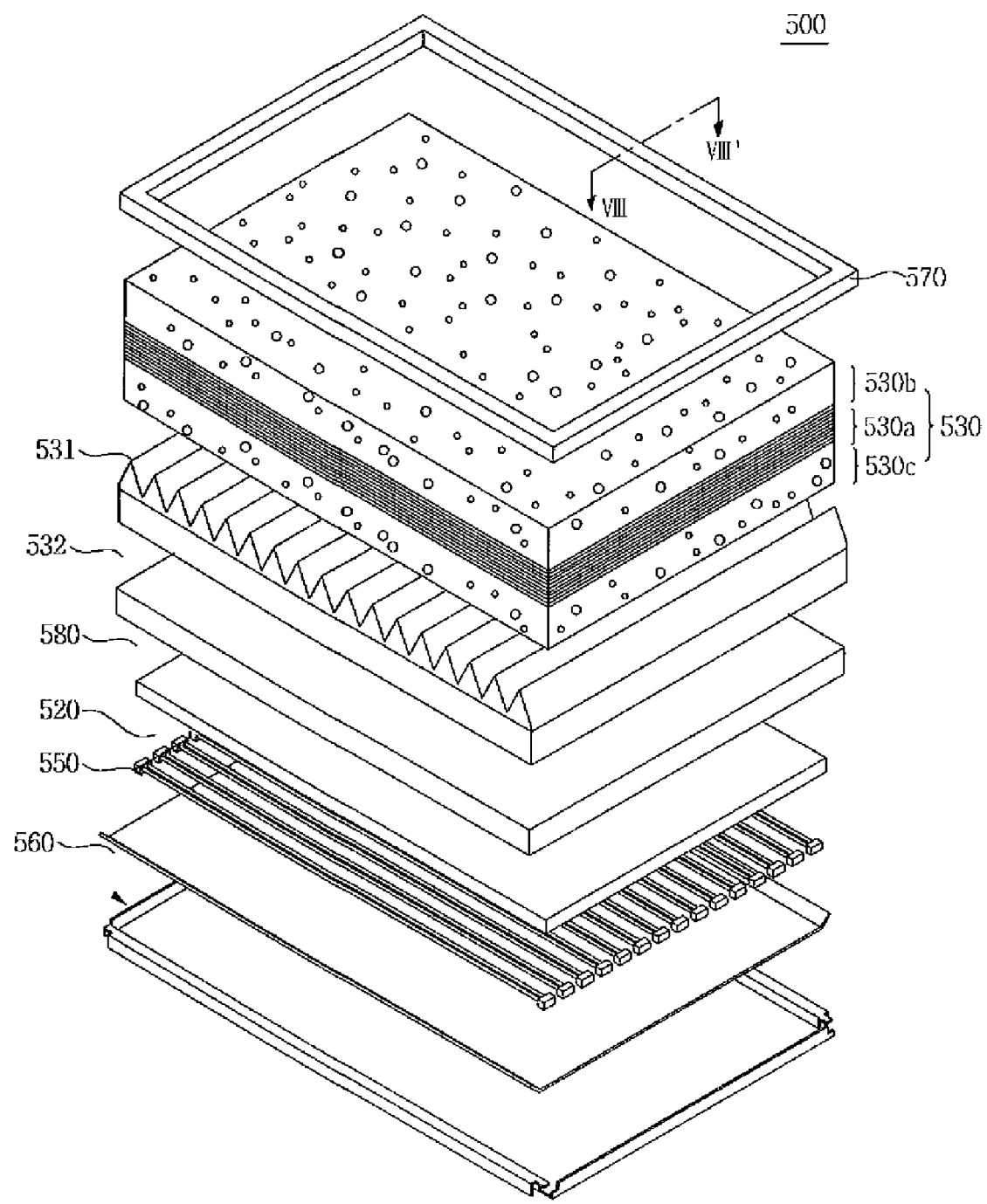
Figure 10:
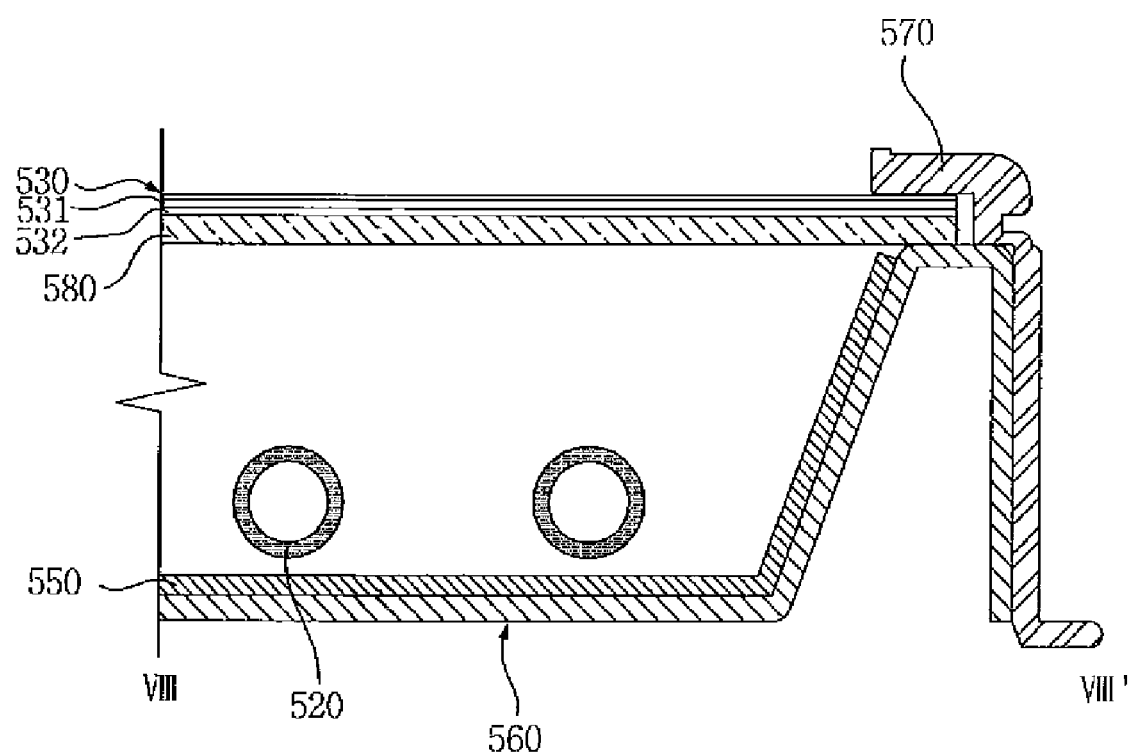

FIGS. 8 to 10 are exploded perspectives view and a cross-sectional view illustrating a configuration of a backlight unit 500 according to an exemplary embodiment of the invention.

FIGS. 8 to 10 show a direct type backlight unit, but other types of backlight units are possible. Since the backlight unit shown in FIGS. 8 to 10 is substantially the same as the backlight unit shown in FIGS. 5 to 7 except a location of a light source and changes in components depending on the location of the light source, the description thereabout is briefly made or entirely omitted.

As shown in FIGS. 8 to 10, the backlight unit 500 may be included in a liquid crystal display and can provide light to a liquid crystal display panel included in the liquid crystal display.

The backlight unit 500 may include a light source 520 and an optical sheet 530. The backlight unit 500 may further include a reflector 550, a bottom cover 560, a mold frame 570, and a diffusion plate 580.

At least one light source 520 may be positioned under the diffusion plate 580. Therefore, light coming from the light source 520 can be directly incident on the diffusion plate 580.

The optical sheet 530 may be positioned on the diffusion plate 580. The optical sheet 530 can focus the light coming from the light source 520.

As shown in FIG. 8, the optical sheet 530 may include a reflective polarizing film 530a, and a first diffusing layer 530b on the reflective polarizing film 530a. The first diffusing layer 530b may include a plurality of first diffusion particles. The first diffusion particles may have a volume distribution as a function of diameter. For a diameter D of a first diffusion particle corresponding to a maximum value of the volume distribution, a percentage of the volume of the first diffusing layer having first diffusion particles with diameters between D−2 μm and D+2 μm is 40% to 80%.

As shown in FIG. 9, the optical sheet 530 may further include a second diffusing layer 530c, including a plurality of second diffusion particles, under the reflective polarizing film 530a. The second diffusion particles may have a volume distribution as a function of diameter. For a diameter D of a second diffusion particle corresponding to a maximum value of the volume distribution, a percentage of the volume of the second diffusing layer having second diffusion particles with diameters between D−2 μm and D+2 μm is 40% to 80%.

With the above described features, the optical sheet 530 can improve the luminance uniformity of the light. As a result, the display quality of the backlight unit 500 can be improved.

At least one of a prism sheet 531 and a diffusion sheet 532 may be positioned between the diffusion plate 580 and the optical sheet 530. The prism sheet 531 or the diffusion sheet 532 may be positioned on the optical sheet 530, and locations of the prism sheet 531 and the diffusion sheet 532 are not limited thereto.

The diffusion plate 580 may be positioned between the light source 520 and the optical sheet 530 and can diffuse upward the light coming from the light source 520. The light source 520 cannot be seen from the top of the backlight unit 500 because of the diffusion plate 580 on the light source 520, and the diffusion plate 580 can further diffuse the light coming from the light source 520.

Figure 11:
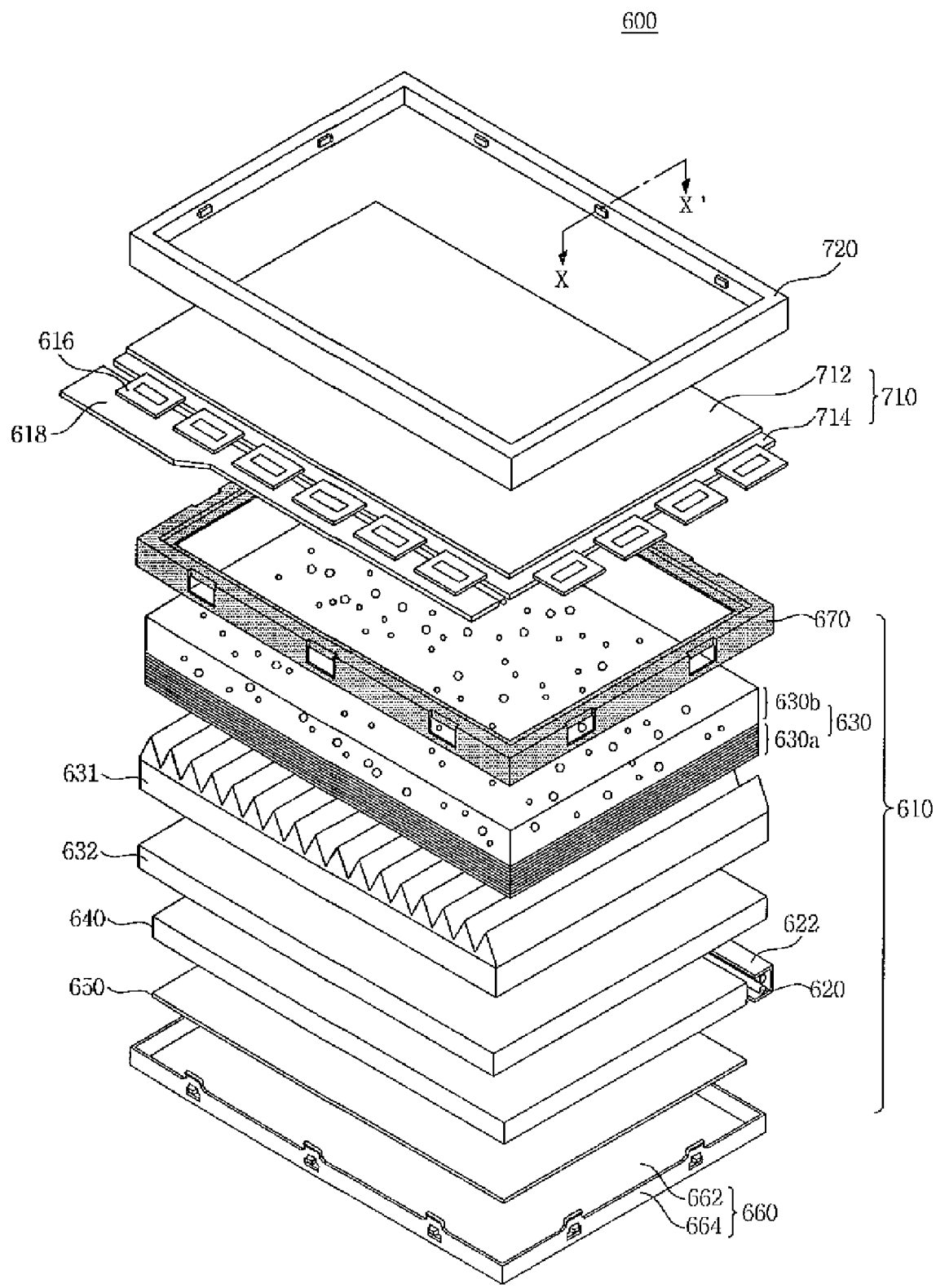
FIGS. 11 to 13 show a liquid crystal display according to an exemplary embodiment of the invention
Figure 12:
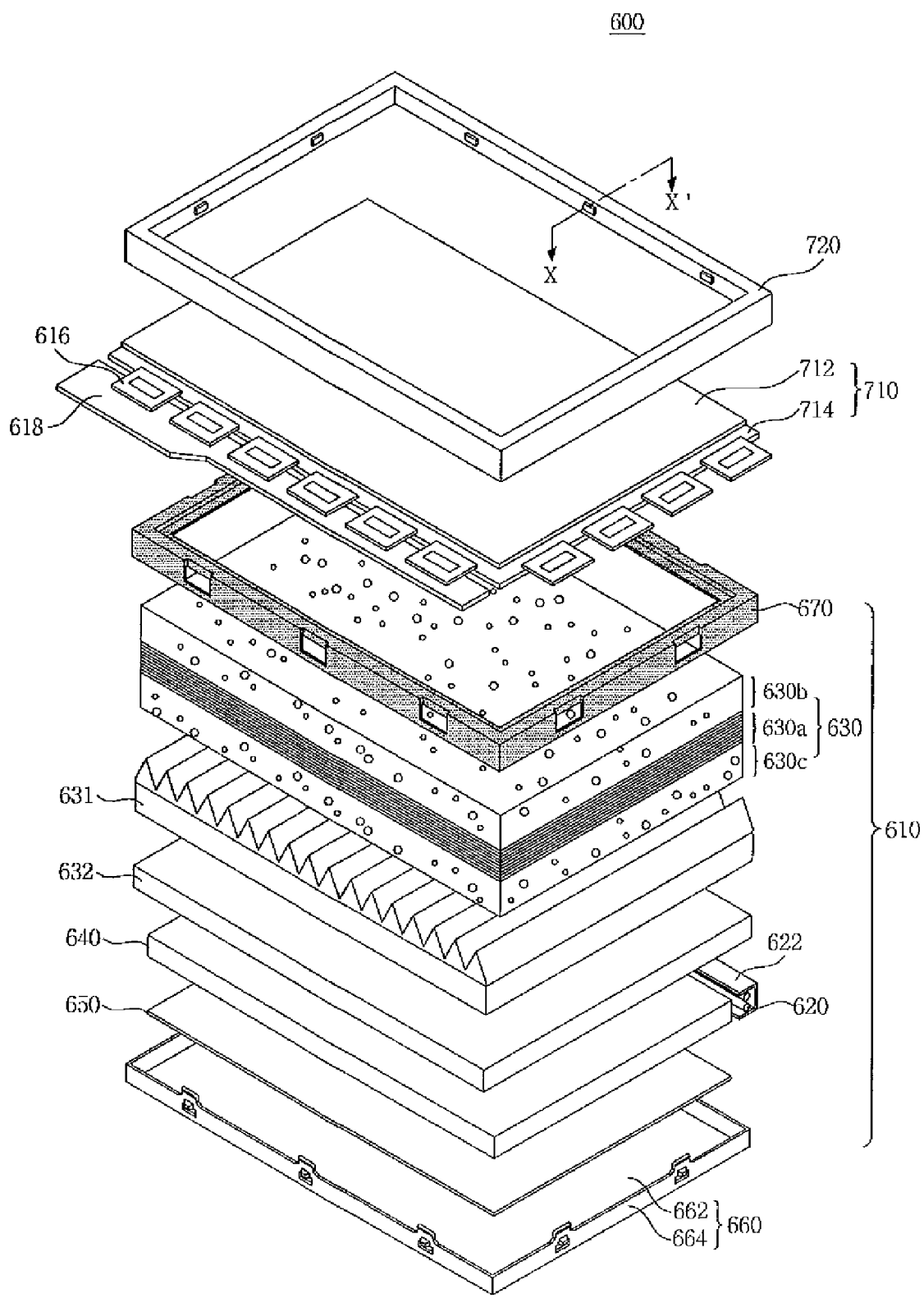
Figure 13:
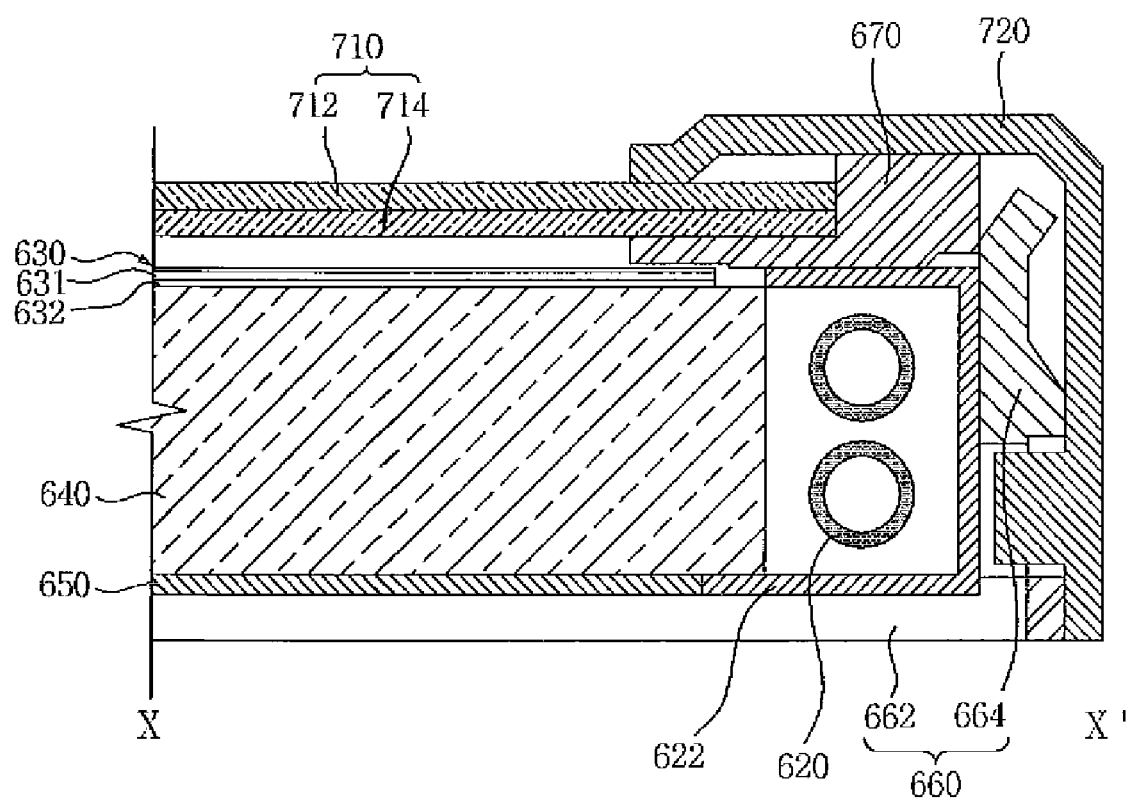

FIGS. 11 to 13 are exploded perspective views and a cross-sectional view illustrating a configuration of a liquid crystal display 600 according to an exemplary embodiment of the invention. The liquid crystal display 600 shown in FIGS. 11 to 13 includes the backlight unit shown in FIGS. 5 to 7, but is not limited thereto. For example, the liquid crystal display 600 may include the backlight unit shown in FIGS. 8 to 10. Since a backlight unit shown in FIGS. 11 to 13 is described above with reference to FIGS. 5 to 7, the description thereabout is briefly made or entirely omitted.

As shown in FIGS. 11 to 13, the liquid crystal display 600 can display an image using electro-optical characteristics of liquid crystals.

The liquid crystal display 600 may include a backlight unit 610 and a liquid crystal display panel 710.

The backlight unit 610 may be positioned under the liquid crystal display panel 710 and can provide the liquid crystal display panel 710 with light.

The backlight unit 610 may include a light source 620 and an optical sheet 630.

The optical sheet 630 may include a reflective polarizing film 630a, and a first diffusing layer 630b on the reflective polarizing film 630a. The first diffusing layer 630b may include a plurality of first diffusion particles. The first diffusion particles may have a volume distribution as a function of diameter. For a diameter D of a first diffusion particle, a percentage of the volume of the first diffusing layer having first diffusion particles with diameters between D−2 μm and D+2 μm is 40% to 80%.

As shown in FIG. 12, the optical sheet 630 may further include a second diffusing layer 430c, including a plurality of second diffusion particles, under the reflective polarizing film 630a. The second diffusion particles may have a volume distribution as a function of diameter. For a diameter D of a second diffusion particle, a percentage of the volume of the second diffusing layer having second diffusion particles with diameters between D−2 μm and D+2 μm is 40% to 80%.

In the optical sheet 630, the reflective polarizing film 630a can improve the efficiency of the light, and the first and second diffusing layers 630b and 630c can improve the diffusion effect of the light. Hence, the luminance uniformity of the light can be improved. As a result, the display quality of the backlight unit 610 can be improved.

The backlight unit 610 may further include a light guide plate 640, a reflector 650, a bottom cover 660, and a mold frame 670.

At least one of a prism sheet 631 and a diffusion sheet 632 may be positioned between the light guide plate 640 and the optical sheet 630. The prism sheet 631 or the diffusion sheet 632 may be positioned on the optical sheet 630, and locations of the prism sheet 631 and the diffusion sheet 632 are not limited thereto.

The liquid crystal display panel 710 may be positioned on the mold frame 670. The liquid crystal display panel 710 may be fixed by a top cover 720 that is fastened to the bottom cover 660 in a top-down manner.

The liquid crystal display panel 710 can display an image using light provided by the light source 620 of the backlight unit 610.

The liquid crystal display panel 710 may include a color filter substrate 712 and a thin film transistor substrate 714 that are opposite to each other with liquid crystals interposed between the color filter substrate 712 and the thin film transistor substrate 714.

The color filter substrate 712 can achieve colors of an image displayed on the liquid crystal display panel 710.

The color filter substrate 712 may include a color filter array of a thin film form on a substrate made of a transparent material such as glass or plastic. For example, the color filter substrate 712 may include red, green, and blue color filters. An upper polarizing plate may be positioned on the color filter substrate 712.

The thin film transistor substrate 714 is electrically connected to a printed circuit board 618, on which a plurality of circuit parts are mounted, through a drive film 616. The thin film transistor substrate 714 can apply a drive voltage provided by the printed circuit board 618 to the liquid crystals in response to a drive signal provided by the printed circuit board 618.

The thin film transistor substrate 714 may include a thin film transistor and a pixel electrode on another substrate made of a transparent material such as glass or plastic. A lower polarizing plate may be positioned under the thin film transistor substrate 714.

As described above, the ratio of certain size particles in the diffusing layer of the optical sheet, the backlight unit including the optical sheet, and the liquid crystal display including the backlight unit, according to the exemplary embodiments of the invention can be controlled to diffuse the light and improve the uniform luminance.

Further, the optical sheet, the backlight unit including the optical sheet, and the liquid crystal display including the backlight unit according to the exemplary embodiments of the invention can further improve the uniform luminance of the optical sheet by further including the second diffusing layer under the reflective polarizing film.

It will be apparent to those skilled in the art that various modifications and variations can be made in the embodiments of the invention without departing from the spirit or scope of the invention. Thus, it is intended that embodiments of the invention cover the modifications and variations of this invention provided they come within the scope of the appended claims and their equivalents.

What is claimed is:

1. An optical sheet, comprising:
    a reflective polarizing film;
    a first diffusing layer on the reflective polarizing film, the first diffusing layer including a resin and a plurality of first diffusion particles; and
    a first adhesive layer between the reflective polarizing film and the first diffusing layer,
    wherein, for a diameter D of the first diffusion particles corresponding to a maximum volume, a first percentage of a volume of the first diffusing layer having first diffusion particles with diameters between D−2 μm and D+2 μm is 40% to 80%,
    wherein the first diffusing layer includes substantially 10 to 50 parts by weight of the diffusion particle based on 100 parts by weight of the resin,
    wherein a thickness of the first adhesive layer is substantially 1 μm to 10 μm, and
    wherein D is substantially 3 μm to 6 μm.

2. The optical sheet of claim 1, wherein a minimum diameter of the first diffusion particles is 0.5 μm.

3. The optical sheet of claim 1, wherein a maximum diameter of the first diffusion particles is 10 μm.

4. The optical sheet of claim 1, wherein each of the first diffusion particles is one of a cavity and a bead.

5. The optical sheet of claim 1, wherein the first diffusion particles are formed of a material selected from the group consisting of polymethylmethacrylate (PMMA), polystyrene, silicon, and a combination thereof.

6. The optical sheet of claim 1, further comprising a second diffusing layer under the reflective polarizing film.

7. The optical sheet of claim 6, further comprising a second adhesive layer between the reflective polarizing film and the second diffusing layer.

8. The optical sheet of claim 6, wherein a second percentage of a volume of the second diffusing layer having second diffusion particles with diameters between D−2 μm and D+2 μm is within a predetermined range.

9. The optical sheet of claim 8, wherein the second percentage is 40% to 80%.

10. The optical sheet of claim 1, wherein the reflective polarizing film includes a first layer and a second layer that are alternately stacked and have different refractive indices.

11. A backlight unit, comprising:
    a light source; and
    an optical sheet on the light source, the optical sheet including
        a reflective polarizing film,
        a first diffusing layer on the reflective polarizing film, the first diffusing layer including a resin and a plurality of first diffusion particles, and
        a first adhesive layer between the reflective polarizing film and the first diffusing layer,
    wherein, for a diameter D of the first diffusion particles corresponding to a maximum volume, a first percentage of a volume of the first diffusing layer having first diffusion particles with diameters between D−2 μm and D+2 μm is within 40% to 80%,
    wherein the first diffusing layer includes substantially 10 to 50 parts by weight of the diffusion particle based on 100 parts by weight of the resin,
    wherein a thickness of the first adhesive layer is substantially 1 μm to 10 μm, and
    wherein D is substantially 3 μm to 6 μm.

12. The backlight unit of claim 11, further comprising a second diffusing layer under the reflective polarizing film.

13. The backlight unit of claim 12, wherein a second percentage of a volume of the second diffusing layer having second diffusion particles with diameters between D−2 μm and D+2 μm is within a predetermined range.

14. The backlight unit of claim 13, wherein the second percentage is 40% to 80%.

15. A liquid crystal display, comprising:
    a light source;
    an optical sheet on the light source, the optical sheet including
        a reflective polarizing film,
        a first diffusing layer on the reflective polarizing film, the first diffusing layer including a resin and a plurality of first diffusion particles, and
        a first adhesive layer between the reflective polarizing film and the first diffusing layer; and
    a liquid crystal display panel on the optical sheet,
    wherein, for a diameter D of the first diffusion particles corresponding to a maximum volume, a first percentage of a volume of the first diffusing layer having first diffusion particles with diameters between D−2 μm and D+2 μm is within 40% to 80%,
    wherein the first diffusing layer includes substantially 10 to 50 parts by weight of the diffusion particle based on 100 parts by weight of the resin,
    wherein a thickness of the first adhesive layer is substantially 1 μm to 10 μm, and
    wherein D is substantially 3 μm to 6 μm.

16. The liquid crystal display of claim 15, further comprising a second diffusing layer under the reflective polarizing film.

17. The liquid crystal display of claim 16, wherein a second percentage of a volume of the second diffusing layer having second diffusion particles with diameters between D−2 μm and D+2 μm is within a predetermined range.

18. The liquid crystal display of claim 17, wherein the second percentage is 40% to 80%.

* * * * *